Patented Sept. 27, 1938

2,131,144

UNITED STATES PATENT OFFICE 2,131,144

HEXAMETHYLENETETRAMINE N BISMUTH IODIDE

Oscar George Salb, Seymour, Ind., assignor to Salb Laboratories, Inc., Indianapolis, Ind., a corporation of Indiana No Drawing. Application June 13, 1932, Serial No. 617,057

8 Claims. (Cl. 260—237)

This invention relates to the manufacture of hexamethylenetetramine N bismuth iodide which has valuable therapeutic properties.

An object of the present invention is to provide an organo-bismuth compound which may be administered orally for effectively treating venereal diseases, especially syphilis. Another object is to provide a process of preparing such compound in pure form suitable for therapeutic use.

Heretofore, active treatment of syphilis was generally performed by intramuscular and intravenous injections when metal compounds, including those of bismuth, were used. The compound of the present invention comprises an iodo-bismuth derivative of hexamethylene tetramine which may be given by mouth in capsule or tablet form, with the same effect as that obtained by injection of other well known compounds, and in some cases, with more rapid beneficial results.

For therapeutic purposes, the metallic content of a given compound is of the utmost importance. To prevent kidney destruction, the metal content should not be greater than that which can be safely taken care of by the kidneys. Bismuth is present in the preferred form of my compound to the extent of 27% by weight and in some cases less, as found by chemical analysis. The bismuth exists as an anion and because of this fact, it more readily penetrates the chloroid plexus.

Nitrogen is present to the extent of 7.42% and iodine to the extent of 51.50%, as found by analysis. The bismuth is attached directly to nitrogen in the compound in which respect it is similar to protein derivatives. Ordinarily when heavy metals are attached to a carbon group, it is impossible to disassociate the groups or group endings.

Iodine, although it has no definite bactericidal effect, has the effect of hastening absorption and excretion.

In general, a compound of the present invention may be prepared in pure form by producing bismuth chloride and reacting this with preferably freshly distilled hydriodic acid free from uncombined iodine. The concentration of the hydriodic acid should be 30%. Bismuth thiiodide is thus formed. This may be purified by crystallization and then dissolved in absolute alcohol which should preferably contain hydriodic acid. The resulting solution is reacted with hexamethylenetetramine (otherwise known as formin or hexamine) preferably dissolved in absolute alcohol. The mixture is thoroughly boiled whereupon a red copious crystalline precipitate forms, and the reacting materials are permitted to stand until the reaction is complete. Purification of the crystalline compound formed may be carried on until a compound of the desired theoretical formula is obtained.

More specifically, and by way of example, the compound may be prepared by dissolving 58.9 parts by weight of purified bismuth triiodide, in about 195 to 200 parts by weight of absolute alcohol. To the alcohol is previously added 10 parts by weight of freshly distilled hydriodic acid which is free from uncombined iodine.

To the resulting solution, which is heated and kept boiling, is added a solution containing 14.0 parts by weight of hexamethylene tetramine dissolved in 115 to 120 parts by weight of absolute alcohol. This solution is boiled and added very gradually with constant stirring to the solution of bismuth triiodide while the latter is kept at boiling temperature. A copious dark red precipitate forms which is allowed to stand in the supernatant liquid for several hours after which the precipitate is separated by filtration or otherwise and dried at below 100° C.

The formula of the preferred form of my compound may be represented graphically by $BiI_3N_4(CH_2)_6$ and structurally by the following:

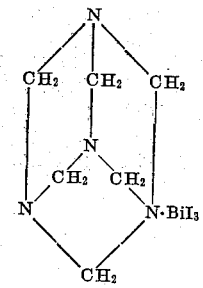

Theoretically this compound contains 28.54% bismuth, 52.24% iodine, and 7.68% nitrogen.

This compound is a bright red crystalline substance insoluble in water, fats, oils, benzene, alcohol, ether, chloroform, carbon disulphide, but is slightly soluble in acetone and xylol. On heating the compound above 100° C., it turns very dark and on cooling, it assumes its original color. Above 100° C. the compound decomposes with liberation of iodine.

By varying the proportions of the hydriodic acid and the hexamethylenetetramine in the above procedure, it is possible to produce a compound containing varying percentages of bismuth, and of iodine. For instance, by using an excess of hydriodic acid, I can produce a compound that has a much higher iodine content but a lower bismuth content. In producing a compound having the above structural formula, the reagents are employed in molecular proportions, as given in the above specific example.

The above compound, when given by mouth, is found to penetrate the brain, blood, choroid plexus, cerebro-spinal fluid, the spinal cord and other organs of the anatomy. The actual percentage of bismuth in the various tissues after the administration of therapeutic doses can be demonstrated by quantitative chemical methods.

The above compound being insoluble in water, is admirably adapted for internal medication due to the fact that the bismuth is slowly liberated and does not cause kidney damage, as would a soluble salt of bismuth or other heavy metal. The protection given by bismuth as a preventive for syphilis, generally exceeds that conferred by other well known substances, and it may be particularly given in cases which are hypersensitive toward such other substances. Developments in the field may show that the compound hereinbefore described has utility in treating other diseases.

What I claim is:

1. A process of preparing hexamethylenetetramine bismuth iodide, which process comprises reacting hexamethylenetetramine with bismuth iodide in the presence of hydriodic acid liquid solution the solvent in which permits the precipitation of hexamethylenetetramine bismuth iodide thus formed.

2. A process of preparing hexamethylenetetramine bismuth iodide, which process comprises dissolving bismuth iodide in alcohol containing hydriodic acid, and adding to the resulting solution a solution of hexamethylenetetramine in alcohol to form a precipitate comprising hexamethylenetetramine bismuth iodide.

3. A process of preparing hexamethylenetetramine bismuth iodide, which process comprises reacting bismuth chloride with hydriodic acid to form bismuth iodide, dissolving the resulting bismuth iodide in absolute alcohol containing hydriodic acid, and adding to the resulting solution hexamethylenetetramine to form a precipitate of hexamethylenetetramine bismuth iodide.

4. A process of preparing hexamethylenetetramine bismuth iodide for therapeutic use, which process comprises reacting bismuth chloride with a freshly distilled hydriodic acid product free from iodine and containing 30% hydriodic acid to form bismuth triiodide, purifying the bismuth triiodide, dissolving the purified bismuth triiodide in absolute alcohol containing hydriodic acid, adding to the resulting solution a solution of hexamethylenetetramine in absolute alcohol to form hexamethylenetetramine bismuth iodide.

5. A compound for therapeutic use, consisting of hexamethylenetetramine bismuth iodide in the form of red crystals, insoluble in water and in a number of the usual organic solvents, and being a valuable anti-syphilitic for oral administration.

6. In a process of preparing a compound for therapeutic use, reacting hexamethylenetetramine and bismuth iodide in the presence of hydriodic acid in a solvent that permits precipitation of hexamethylenetetramine bismuth iodide thus formed, separating the precipitate from the solvent and purifying the separated solid for therapeutic use.

7. A process of preparing a compound for therapeutic use, which process comprises bringing together a solution of bismuth triiodide prepared by dissolving substantially 58.9 parts by weight of bismuth triiodide in about 195 to about 200 parts by weight of absolute alcohol to which has been added about 10 parts by weight of hydriodic acid; and a solution containing about 14 parts by weight of hexamethylenetetramine dissolved in about 115 to about 120 parts by weight of absolute alcohol; thereby forming a precipitate comprising hexamethylenetetramine bismuth iodide, and separating the precipitate from the resulting material to provide a product for oral administration in syphilis treatment.

8. A compound for therapeutic use having substantially the following formula:

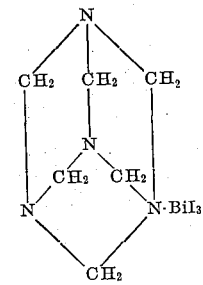

the said compound being a valuable anti-syphilitic for oral administration.

OSCAR GEORGE SALB.